United States Patent [19]

Burguette et al.

[11] Patent Number: 4,526,833
[45] Date of Patent: Jul. 2, 1985

[54] MAGNETIC RECORDING MEDIUM HAVING A PERFLUOROPOLYETHER POLYMER PROTECTIVE COATING

[75] Inventors: Mario D. Burguette, Woodbury, Minn.; George D. Foss, River Falls, Wis.

[73] Assignee: Minnesota Mining and Manufacturing Company, St. Paul, Minn.

[21] Appl. No.: 538,662

[22] Filed: Oct. 3, 1983

[51] Int. Cl.³ .................................................. G11B 5/72
[52] U.S. Cl. .................................... 428/336; 360/134; 360/135; 360/136; 427/128; 427/131; 427/132; 428/420; 428/421; 428/422; 428/694; 428/695; 428/900
[58] Field of Search ............... 428/422, 420, 704, 421, 428/695, 694, 900, 336; 427/131, 132, 128; 360/134–136

[56] References Cited

U.S. PATENT DOCUMENTS

| | | | |
|---|---|---|---|
| 2,941,912 | 6/1960 | Cox | 428/422 |
| 2,979,418 | 4/1961 | Dipuer | 428/422 |
| 2,994,632 | 8/1961 | Brown | 428/422 |
| 3,066,112 | 11/1962 | Bowen | |
| 3,380,974 | 4/1968 | Stilmar | 428/422 |
| 3,470,014 | 9/1969 | Kublitz | 428/422 |
| 3,778,308 | 12/1973 | Roller | 428/900 |
| 3,919,719 | 11/1975 | Wright | 360/134 |
| 4,094,911 | 6/1978 | Mitsch | 260/615 A |
| 4,210,946 | 7/1980 | Iwasaki | 428/900 |
| 4,259,075 | 3/1981 | Yamauchi | 433/217 |
| 4,267,238 | 5/1981 | Chernega | 428/422 |
| 4,268,556 | 5/1981 | Pedrotty | 428/65 |
| 4,321,404 | 3/1982 | Williams | 560/115 |
| 4,404,247 | 9/1983 | Burguette | 428/213 |
| 4,419,404 | 12/1963 | Arai | 428/900 |

OTHER PUBLICATIONS

Yang, "Deposition of Ultrathin Films by a Withdrawal Method", *Thin Solid Films*, vol. 47, pp. 117–127, (1980).

*Primary Examiner*—Ellis P. Robinson
*Attorney, Agent, or Firm*—Donald M. Sell; James A. Smith; Douglas B. Little

[57] ABSTRACT

A magnetic recording medium protected by a very thin, composite low surface energy covering is disclosed. The covering comprises a primer layer of a polymerized phosphorylated monomer or oligomer and an outer lubricant layer of perfluoropolyether polymer. The two layers may be polymerized in situ. The primer layer is made from monomers such as phosphorylated bis[4( methacryloyloxyhydroxypropylcarbamato)cyclohexyl]methane. The outer layer is made from a polymerizable perfluoropolyether monomer such as

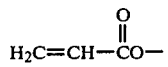

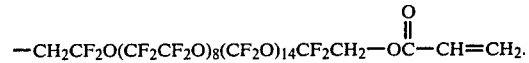

The composite low surface energy covering is especially useful for providing lubricity and corrosion resistance to a metallic thin-film magnetic recording coating.

17 Claims, No Drawings

4,526,833

MAGNETIC RECORDING MEDIUM HAVING A PERFLUOROPOLYETHER POLYMER PROTECTIVE COATING

TECHNICAL FIELD

The invention concerns a magnetic recording medium, the magnetizable coating of which is protected by an adherent covering which acts as a lubricant and can also act as a barrier against air if the magnetizable coating is subject to oxidation. The invention especially concerns protective coverings for metallic thin-film magnetic recording media.

BACKGROUND ART

While the magnetizable coatings of virtually all magnetic recording media now in use comprise magnetizable particles dispersed in organic binder, the amount of information that can be recorded on any such medium is reaching the theoretical limit. It is known that information can be recorded more compactly on metallic thin-film magnetic recording media. Such media may be used in perpendicular recording when they have an easy axis of magnetization perpendicular to the surface of the recording layer (see U.S. Pat. No. 4,210,946).

A major problem with metallic thin-film magnetic media is their susceptibility to wear. Record/playback transducer heads contacting the metallic thin film will have a tendency to erode or otherwise damage the film. Even slight erosion will result in considerable loss of data when high bit density recording is employed. Applications involving erosion and severe wear of metallic thin film magnetic media are on the increase, with video tape and electronic cameras being two examples.

Thus, such media require some sort of protective covering. This covering, known as the lubricant or top coat, functions to: lubricate, add corrosion protection, and give wear resistance to the magnetic medium. Among the wide variety of lubricants developed for magnetic media are fluorinated polyethers (e.g. see U.S. Pat. Nos. 3,778,308, 4,267,238 and 4,268,556).

The lubrication or top coat layer should be firmly anchored to the magnetic recording layer so that it will not be removed or cause clogging of the recording or playback heads. In most cases in the prior art, it is believed that the fluorinated lubricants have been applied as coatings from halogenated solutions or emulsions with no means, other than physical absorption or adsorption, of bonding the lubricant to the magnetic recording medium.

Commonly assigned U.S. Pat. No. 4,404,247 discloses a protective covering for magnetic recording media comprising: a. an inner layer of film forming aromatic or heterocyclic polymerizable monomer and vinyl aromatic comonomer, and b. an outer layer of a compound containing perfluoropolyether segments. The above materials are applied in solution to magnetic recording media in two discrete coating steps and are subsequently in-situ polymerized. The contiguous monomers of the two layers are said to copolymerize, bonding the perfluoropolyether segments to the magnetizable coating through the inner layer. The perfluoropolyether lubricant is said to have a significantly greater adherence to the metallic thin-film magnetizable recording medium than it would have if it had been directly applied, because of the inner layer material.

DISCLOSURE OF INVENTION

An improved composite, low surface energy, adherent covering which protects substrates, such as metallic thin-film magnetic recording media, from abrasion has been invented. Briefly, the invention comprises a substrate, a surface of which is covered by a protective coating comprising:
(a) a primer layer comprising a polymer made from a phosphorylated monomer or oligomer which is soluble in at least one common organic solvent and which contains at least one aromatic, cycloaliphatic or hetero atom moiety; and
(b) an outer layer comprising a polymer made from at least one perfluoropolyether comprising a plurality of perfluoroalkylene oxide repeating units.

A substrate which benefits from this invention is a magnetic recording medium having a magnetizable coating.

The term common organic solvent as used herein means commonly used non-fluorinated organic solvents of the following types: aromatics (such as xylene, benzene, and toluene); ketones (such as methylethylketone (MEK), methylisobutylketone and cyclohexanone); ethers (such as tetrahydrofuran); esters; amides; alcohols (such as ethanol); chlorinated aliphatic, cycloaliphatic and aromatic solvents; and blends of the foregoing.

Both the monomers and oligomers used to make the primer layer of part a. and the perfluoropolyether monomer used to make the outer layer of part b. are polymerizable. That is they have polymerizable functional groups such as terminal ethylene double bonds, epoxide rings, ester, carboxylic acid, hydroxy or amine groups capable of condensation polymerization, or isocyanate radicals capable of reacting to form urethane linkages.

The perfluoropolyether monomers may be classed as polyfunctional terminated poly(perfluoroalkylene oxide) polymers or oligomers. They preferably have an average of at least about 1.5 terminal ethylenically unsaturated polymerizable sites per molecule.

The phosphorylated monomers and oligomers of part a. preferably have a branched structure and also a plurality of ethylenically unsaturated polymerizable moieties. For convenience, phosphorylated monomers and oligomers are referred to hereinafter as primer.

When a coating is added to a recording medium surface, there is a resulting loss in output signal depending on the thickness of the coating. This is called head spacing loss. The composite, low surface energy covering of this invention is very thin, and can approach monomolecularity, thereby minimizing head spacing losses.

While being exceedingly difficult to measure, preferred thicknesses of the composite low surface energy coverings of the invention on recording media are in the approximate range of 5 to 200 nm, more preferably within 5 to 25 nanometers (nm). Even at thicknesses of the order of 10 nm, the novel low surface energy covering provides adequate lubricity for sufficiently long periods of time. Increased thicknesses up to 200 nm may provide somewhat longer life where the recording medium is in rugged service, e.g. repeated stop-action at the same frame of a video tape. At thicknesses much greater than 200 nm, spacing losses would become undesirably large.

The protective covering of the invention may be applied over the surface of the magnetizable coating of a recording medium or some other substrate by the steps of:

(i) coating onto the surface a first dilute, (e.g. one weight percent or less) solution of said primer in a solvent, e.g. methyl ethyl ketone, to provide an inner coating of resin which preferably is dried to remove most of the solvent.

(ii) coating over the coating of step (i) a second dilute solution of said perfluoropolyether monomer in a fluorinated solvent, e.g. "Freon" 113-(1,1,2-trichloro-2,2,1-trifluoroethane) to provide an outer coating of such monomer;

(iii) drying the composite coating (to remove solvent); and (iv) subjecting the dried composite coating to polymerization conditions to polymerize said monomers (which preferably are addition polymerizable), thus bonding the perfluoropolyether to the magnetizable coating through the primer layer.

Exposure of the dried coatings to electromagnetic radiation (such as ultraviolet or electron beam radiation) can be the means of curing or polymerizing the coating.

By covering the magnetizable coating with the composite protective covering in the manner described above, no significant dimensional changes in the recording medium occur, which will be particularly important where such recording medium is very thin, as in the case of a metallic thin-film recording tape.

This provides a low surface energy, adherent covering which protects metallic thin film magnetic media from abrasion and provides corrosion protection. Improved endurance is imparted to recording media via the protective coating, and better wetting of the media surface has been observed. The protective coating of this invention does not require the vinyl aromatic comonomer of U.S. Pat. No. 4,404,247. In addition uniform coatings less than 20 nanometers thick have been achieved with the inventive coatings; whereas, such thin coatings of other materials can lead to nonuniformity.

The two-layer compositions described may also be used as protective coatings for particulate/binder type magnetic media.

DETAILED DESCRIPTION

The primers of part a. are synthesized from compounds which have reactive sites for the phosphoric acid radical. Such sites are exemplified by: epoxide, hydroxyl, —NH—, and thiol —SH groups.

The phosphorylating reagent reacted with such compounds may be a phosphoric acid derivative having the formula $$R_p-X-\underset{\underset{Cl}{|}}{\overset{\overset{Cl}{|}}{P}}=O$$

in which $R_p$ is an alkyl, cycloalkyl or aromatic group, and X is —O—, —S—, or

wherein R' can be hydrogen or Rp.

Some of the suitable classes of primers are: phosphorylated α,β-unsaturated carboxylic acid esters of hydroxyalkoxylated phenols such as hydroxypropoxylated bisphenol A; phosphorylated acrylates or methacrylates of glycidyl esters of dicarboxylic acids such as diglycidyl isophthalate; and phosphorylated acrylates of hydroxy urethanes.

The following group of phosphorylated dimethacrylates represent primers which have been found particularly useful as the resin of part a:

phosphorylated bis[4-methacryloyloxyhydroxypropylcarbamato-cyclohexyl]methane;

phosphorylated methacryloyloxyhydroxypropylisophthalate; and phosphorylated dimethacrylate of hydroxypropoxylated bisphenol A.

In addition to the acrylates and methacrylates exemplified above, other unsaturated acid groups having up to five or six carbon atoms may be used.

The perfluoropolyether monomers of part b. preferably have the formula $$Q-(R_f)_k C_a F_{2a}-Z \tag{A}$$

wherein Q comprises a polymerizable group attached to $R_f$, which represents a chain of two or more randomly distributed perfluoroalkylene oxide units which may be branched or straight chain structures, exemplified by the group consisting of

in which a is independently an integer of 1 to 4, k is the number of such units having a value from 2 to 300 such that the segment $R_f$ preferably has a number average molecular weight of 500 to 10,000 (more preferably 500–6000), and Z is —$OC_aF_{2a+1}$ or Q.

The use of the term "independently" with reference to subscript a means that, while within each perfluoroalkylene oxide unit the subscripts a have the same number, the a may vary independently from one perfluoroalkylene oxide unit to another. Thus, formula A encompasses polyethers in which —CF$_2$O— and —C$_3$F$_6$O— are bonded together as randomly repeating units in the molecule, the subscript a's being 1 in the former unit and 3 in the latter unit.

If Z is not Q, it preferably is —OCF$_3$, —OCF$_2$CF$_3$, or —OCF(CF$_3$)CF$_3$. Typically the perfluoroalkylene oxide units will be —CF$_2$O—, —C$_2$F$_4$O—, and/or —C$_3$F$_6$O—.

Preferred perfluoropolyether monomers are the ethylenically unsaturated monomers disclosed in U.S. Pat. No. 3,810,874 (Mitsch et al.) and U.S. Pat. No. 4,321,404 (Williams et al.) wherein Q of the above formula A is selected from

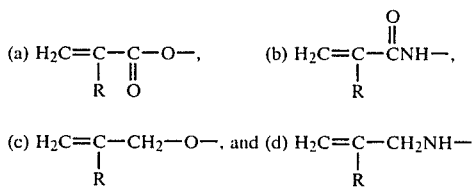

wherein R is hydrogen or methyl. The preferred ethylenically-unsaturated perfluoropolyether monomers have the formula Q—CF$_2$O(CF$_2$CF$_2$O)$_m$(CF$_2$O)$_n$CF$_2$—Q   (B)

randomly distributed, the given number (subscripts) of which represents an average value.

Perfluoropolyether

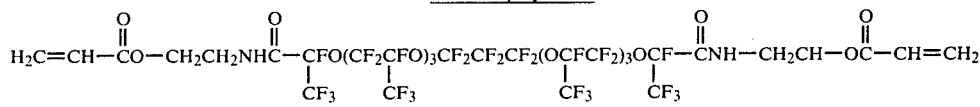

I

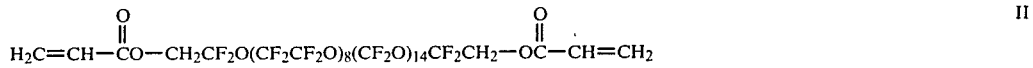

II

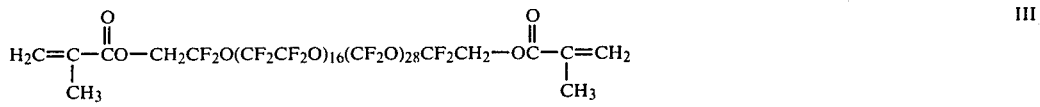

III

H$_2$C=CHCH$_2$OCH$_2$CF$_2$O(CF$_2$CF$_2$O)$_{16}$(CF$_2$O)$_{28}$CF$_2$CH$_2$OCH$_2$CH=CH$_2$   IV

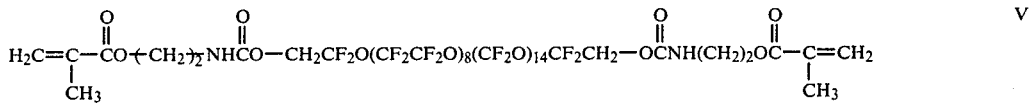

V

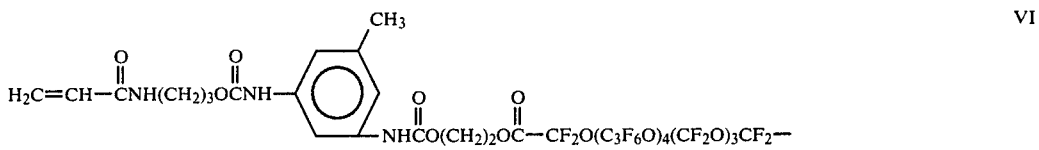

VI

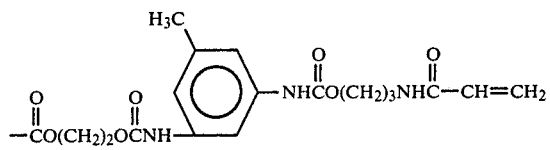

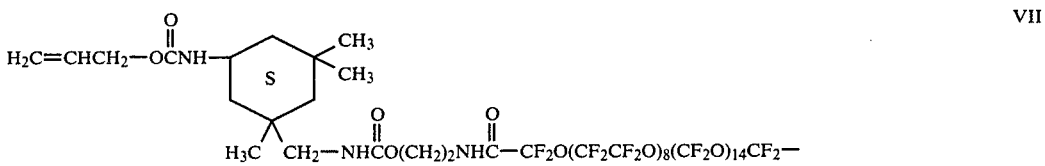

VII

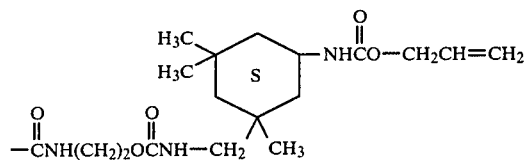

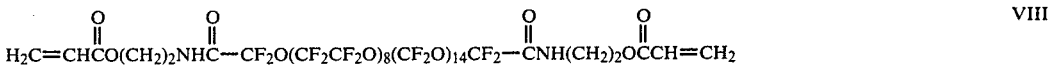

VIII

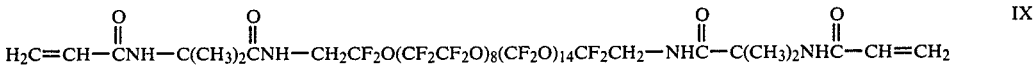

IX

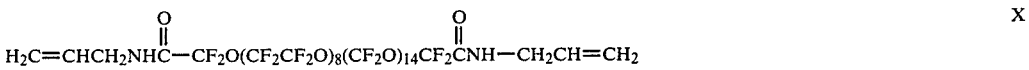

X wherein Q is defined above and m and n designate the number of randomly distributed perfluoroethyleneoxy and perfluoromethyleneoxy units, respectively n and m having independently values, for example, from 1 to 200, and the ratio m/n is 0.2/1 to 5/1, preferably about 0.8/1. A preferred molecular weight range is 2000 to 4000 for the thin metal film top coat.

Examples of polymerizable perfluoropolyether monomers useful in this invention are those of the following formulas wherein the perfluoroalkylene oxide units are Preferably, the weight ratio of perfluoropolyether to primer is about 1/1 to 5/1. As that ratio increases over 5/1, the cohesiveness and the adhesion to the underlying substrate would be reduced.

In addition to the perfluoropolyether monomer, the solution used to apply the outer coating may contain one or more copolymerizable monomers of other types in amounts up to about 20% by weight of the outer layer. However, the composite low surface energy covering is most effective if at least 75% of the weight of the outer layer is provided by perfluoropolyether segments. Useful copolymerizable monomers of this purpose include acrylic and methacrylic esters, amides, and urethanes, and vinyl ethers, esters, and heterocycles.

The invention will be further clarified by a consideration of the following examples which are intended to be purely exemplary. The first three examples present organic syntheses of primers of part a.

EXAMPLE I

Preparation of Primer A Phosphorylated Bis[4-methacryloyloxyhydroxy propylcarbamato-cyclohexyl]methane Step 1. Reactants
6.6 parts (by weight) Dicyclohexylmethane-4,4′diisocyanate
4.0 parts (by weight) Glycidol
0.1 parts (by weight) Dibutyltindilaurate
20.0 parts (by weight) Toluene The reactants were placed into a 3-neck reaction flask fitted with a thermometer, mechanical stirrer and condenser. The reaction mixture was subsequently heated to about 100° C. and maintained at said temperature for about 2 hours. The volatiles were subsequently removed at a temperature of about 60° C. and a pressure of about 5 mm Hg. The resultant product ie., Dicyclohexylmethane-4,4′-diglycidyl carbamate) was used as such to prepare the methacryloyl derivative.

Further suitable diisocyanates include: Diphenylmethyldiisocyanate, 4,4′-diphenyletherdiisocyanate, isopropyledene bis(4-phenylisocyanate), bis-phenylenediisocyanate and isocyanate terminated urethane prepolymers and the like.

Step 2. Reactants
10.0 parts (by weight) Product from Step 1.
5.5 parts (by weight) Methacrylic acid
0.03 parts (by weight) 2,4,6-trimethoxyphenol
10.0 parts (by weight) Benzene
20.0 parts (by weight) Toluene The product from Step 1 was dissolved in the benzene and toluene solvent blend of Step 2 with the remaining ingredients being subsequently added. The reaction mixture temperature was slowly increased to about 100° C. and maintained at said temperature for about 2 hours, while said mixture was continuously agitated. Following this reaction period, the excess methacrylic acid, solvent and other volatiles were stripped off at a temperature of about 60° C. and a pressure of about 10 mm of Hg. A viscous syrup resulted which was utilized as such to prepare the phosphorylated product.

Step 3.
N,N-diethylamidodichlorophosphoric acid (1 part by weight) was dissolved in 10 parts of dry benzene and thence added to a solution comprising 10 parts of the methacryloyl derivative product of Step 2 along with 1.15 parts of triethylamine in 60 parts of dry benzene. The reaction mixture was heated to a temperature of about 50° C. and maintained at said temperature, while being continuously agitated, for about 12 hours. This was followed by removal of triethylamine hydrochloride by-product via filtration. Benzene and other volatiles were further removed from the filtrate, under reduced pressure. The remaining residue was washed with benzene which was subsequently removed at a temperature of about 60°–65° C. and a pressure of about 20 mm of Hg. The resultant viscous product, phosphorylated bis[4-methacryloyloxyhydroxypropylcarbamato)cyclohexyl]methane, comprised one component of the protective coating as further detailed in Example IV.

A suitable degree of phosphorylation will include the range of greater than 0 to about 30% by weight with about 0.2 equivalents per equivalent of polyol being a preferred amount.

The N,N-diethylamidodichlorophosphoric acid intermediate of Step 3 can be prepared via the reaction of 6.0 parts by weight of N,N-diethylamine and 8.3 parts of triethylamine in 60 parts of dry benzene, with 12.5 parts of POCl$_3$ dissolved in 65 parts of dry benzene added slowly with agitation maintaining a temperature of 10° C. The mixture is stirred for an additional two hours at room temperature. The solid triethylamine hydrochloride by-product is subsequently removed via filtration. Solvent is stripped from the filtrate under reduced pressure to obtain the intermediate. Diphenyl, dimethyl and dicycloalkyl amidodichlorophosphoric acids are other useful phosphorylating reagents which may be similarly synthesized.

EXAMPLE II

Preparation of Primer B Phosphorylated Methacryloyloxyhydroxypropylisophthalate

Step 1.
4.4 parts by weight of glycidol, 6.0 parts of triethylamine and 30 parts of dry benzene were added to a 150 ml 3 neck flask, adapted to hold a dropping funnel, mechanical stirrer and thermometer, said flask being subsequently cooled to about 0° C. 6.1 parts of isophthaloyl chloride in 15.0 parts of dry benzene were introduced in a dropwise manner into said flask over a period of about 70 minutes, while maintaining a temperature below about 25° C. The reaction mixture was agitated at about room temperature for about 1 hour and then filtered. The filtrate was stripped of solvent under reduced pressure to yield a soft mass of solute.

Acrylation of said solute was accomplished as follows:

Step 2. Reactants
8.0 parts (by weight) Solute (product) from Step 1
6.0 parts (by weight) Methacrylic acid
0.1 parts (by weight) 2,4,6-trimethoxyphenol
20.0 parts (by weight) Dry Benzene
30.0 parts (by weight) Toluene The above reactants were placed in a reaction flask as in Step 1 and slowly heated to a temperature of about 100° C. and maintained at said temperature for about 2 hours. The excess methacrylic acid and other volatiles were subsequently removed at a temperature of about 60° C. and at a reduced pressure of about 20 mm of Hg. The viscous mass of solute (product) obtained was utilized as such in the phosphorylation step which follows.

Step 3. Reactants
10.0 parts (by weight) Solute (product) from Step 2
15.0 parts (by weight) Benzene
1.5 parts (by weight) N,N-diethylamidodichlorophosphoric acid
40.0 parts (by weight) Dry Benzene
1.6 parts (by weight) Triethylamine This reaction was carried out as described in Step 3 of Example I.

EXAMPLE III

Preparation of Primer C Phosphorylated Dimethacrylate of Hydroxypropoxylated Bisphenol A The dimethacrylate of hydroxypropoxylated bisphenol A is the reaction product of bisphenol A and glycidyl methacrylate, and its synthesis is taught in U.S. Pat. No. 3,066,112. It may be phosporylated using the reagents and procedures previously described.

A preferred material is prepared as follows.
Reagents
10.0 parts (by weight) Dimethacrylate of hydroxypropoxylated bisphenol A
1.6 parts (by weight) N,N-diethylamidodichlorophosphoric acid in 15.0 parts of dry benzene
1.7 parts (by weight) Triethylamine in 40 parts of dry benzene
40.0 parts (by weight) Dry Benzene The reaction mixture of the above ingredients is agitated for about 12 hours while at about 40° C., to yield the phosphorylated product.

The next several examples present the inventive protective coating compositions and tests of those compositions. For each example, the recording medium comprised a biaxially oriented polyester film backing having thickness of about 15–20 micrometers and a width of roughly 1.3 cm. and an aluminum thin film coating on one surface. Over that coating was vapor deposited a cobalt-nickel-titanium alloy to a thickness of about 1000 angstroms to provide a magnetizable coating.

Strips of this medium were dip coated by the process described by C. C. Yang et al, *Thin Solid Films,* Vol. 74, pp. 117–127 (1980). This method comprises withdrawing a tape from a container of dilute coating composition by means of a nylon thread attached to the shaft of a low speed synchronous motor.

The magnetic recording media were dip coated in primer solution first, and, after being allowed to dry for a few seconds, were dip coated in solution of perfluoropolyether. The preferred concentration range for the primer solution is about 0.1 to 0.7 weight/volume percent, and the preferred range for the perfluoropolyether is about 0.05 to 0.2 weight/volume percent.

After the dip coated media were allowed to dry, they were subjected to ultraviolet radiation in a vacuum using a BTC Ascor vacuum printer 1601-11 (Berkey Technical, Burbank, Calif.) using a 2 kw Addalux medium pressure mercury lamp no. 1406-02. Eight minutes was a typical exposure time. This polymerized the coatings to provide a low surface energy topcoat. During the photopolymerization, the system should remain oxygen free by maintaining a vacuum or an inert atmosphere. Photopolymerization initiators or sensitizers (e.g. benzophenone or benzoin) may be incorporated into the compositions of this invention. Other methods may also be used to polymerize the compositions of this invention, such as: electron beam curing, thermal curing, and gas curing (e.g. ammonia for isocyanate groups).

Thickness of the composite coating may be controlled by the proportion of solvent used to make the two dilute solutions. Coating techniques include brushing, wire or knife coating, spraying, and gravure coating.

Several tests are used to judge the quality of the cured top coat. In the scratch resistance test, a piece of magnetic recording medium is mounted on a microscope slide, typically by means of adhesive tape. The slide is placed in contact with a sapphire bead about 1.5 millimeters in diameter which bead is affixed to the end of a tapered hollow tube which is filled with metal shot to a total weight of about 85 grams. The resulting pressure on the surface of the magnetic thin film recording medium has been calculated to be about 1,000 kg/cm$^2$ (9.8×10$^8$ dynes/cm$^2$). The slide is oscillated by means of a motor driven mechanism at a frequency of about 100 cycles per minute and a stroke length of about four centimeters. Failure of the recording medium is readily discerned as a visible scratch through the thin metal film, and time or number of cycles to failure is the parameter used to measure the endurance of the protective lubricant coating. This failure can be reported by means of a digital counter which is actuated by a photocell detecting light shining through the scratch. Recording media without a top coat fail this test after one cycle of the oscillation.

Coefficient of friction, as measured by the Inclined Plane Standard method, ANSI BH1.47 1972 of the American National Standards Institute, is another test of the performance of lubricant coating. Each scratch resistance test and coefficient of friction test value is an average of six such tests.

EXAMPLE IV

A 0.15 weight/volume percent primer solution was prepared by dissolving 150 mg. of Primer A in 100 ml of MEK. A 0.12 weight/volume percent lubricant solution was prepared by dissolving 120 mg. of the perfluoropolyether of formula II (having an average molecular weight of about 2000) in 100 ml. of a fluorocarbon solvent (Fluorinert FC77 solvent obtained from Minnesota Mining and Manufacturing Company). A magnetic thin film recording medium was coated with these two solutions as described above to yield a composite layer about 20 nanometers thick. This coating was cured via exposure to ultraviolet radiation for about seven minutes. The following test results were obtained with this coated medium: coefficient of friction ($\mu$) of about 0.19 and scratch resistance value of about 308 cycles.

EXAMPLE V

The procedure of Example IV was carried out but using Primer B instead of A. The composite coating was less than about 20 nanometers thick, and the coated medium yielded the following test results: $\mu$ of about 0.18 to 0.19 and scratch resistance value of about 262 cycles.

EXAMPLE VI

The procedure of Example IV was carried out but using Primer C as the primer. The composite coating thickness was again less than about 20 nm., and the coated medium yielded the following test results: $\mu$ of about 0.19 and a scratch resistance value of about 408.

Other embodiments of this invention will be apparent to those skilled in the art from a consideration of this specification or practice of the invention disclosed herein. Various omissions, modifications and changes to the principles described herein may be made by one skilled in the art without departing from the true scope and spirit of the invention which is indicated by the following claims.

What is claimed is:

1. A substrate, a surface of which is covered by a protective coating present in an amount sufficient to lubricate said surface and comprising:
   (a) a primer layer comprising a polymer made from a phosphorylated monomer or oligomer which is soluble in at least one common organic solvent and which contains at least one aromatic, cycloaliphatic or hetero atom moiety; and
   (b) an outer layer comprising a polymer made from at least one perfluoropolyether comprising a plurality of perfluoroalkylene oxide repeating units.

2. The substrate of claim 1 which is a magnetic recording medium having a magnetizable coating on which the protective coating has a thickness in the approximate range of about 5 to 200 nanometers.

3. The magnetic recording medium of claim 2 wherein the weight ratio of the perfluoropolyether layer to the primer layer is from about 1/1 to about 5/1.

4. The magnetic recording medium of claim 3 wherein the perfluoropolyether has an average of at least about 1.5 polymerizable ethylenically unsaturated sites per molecule, and the phosphorylated monomer or oligomer has a plurality of ethylenically unsaturated polymerizable moieties.

5. The composition of claim 4 wherein the perfluoropolyether of part b. has the formula $$Q(R_f)_k C_a F_{2a} - Z$$

wherein Q comprises a polymerizable group attached to $R_f$ which represents a chain of one or more randomly distributed perfluoroalkylene oxide units selected from the group consisting of $$(C_a F_{2a} O) \text{ and } (CF-CF_2O) \atop CF_3$$

in which a is independently an integer of 1 to 4, k is the number of such repeating units having a value from 1 to 300 such that the segment $R_f$ preferably has a number average molecular weight of about 500 to 10,000, and Z is selected from the group consisting of $-OC_a F_{2a+1}$ and Q.

6. The composition of claim 5 wherein Q of the formula is selected from the group consisting of (a) $H_2C=C-C-O-$, (b) $H_2C=C-CNH-$,
       $|$   $\|$              $|$    $\|$
       R    O               R    O (c) $H_2C=C-CH_2-O-$, and (d) $H_2C=C-CH_2NH-$
       $|$                        $|$
       R                         R wherein R is hydrogen or methyl.

7. The composition of claim 6 wherein the perfluoropolyether has the formula $$Q-CF_2O(CF_2CF_2O)_m(CF_2O)_n CF_2-Q$$

wherein m and n designate the number of randomly distributed perfluoroethyleneoxy and perfluoromethyleneoxy backbone repeating units respectively, n and m having independently values of from 1 to 200, and the ratio m to n is between about 0.2/1 and about 5/1.

8. The magnetic recording medium of claim 5 wherein the primer layer is made from a compound selected from the group consisting of phosphorylated $\alpha,\beta$-unsaturated carboxylic acid esters of hydroxyalkyl polyhydric phenols; phosphorylated acrylates and methacrylates of glycidyl esters of dicarboxylic acids; and phosphorylated acrylates of hydroxy urethanes.

9. The magnetic recording medium of claim 8 in which the phosphorylated monomer or oligomer of part a. is selected from the group consisting of: phosphorylated bis[4-methacryloyloxyhydroxypropylcarbamato-cyclohexyl]methane; phosphorylated methacryloyloxyhydroxypropylisophthalate; and phosphorylated dimethacrylate of hydroxypropoxylated bisphenol A.

10. The magnetic recording medium as defined in claim 5 wherein said magnetizable coating is a metallic thin-film coating.

11. The magnetic recording medium as defined in claim 5 wherein said protective coating has a thickness of 5 to 25 nm.

12. A method of making a magnetic recording medium with a protective coating on the surface of the magnetizable coating of said medium, comprising the steps of:
   (i) coating onto said surface a dilute solution of a polymerizable phosphorylated monomer or oligomer containing at least one aromatic, cycloaliphatic or hetero atom moiety, said solution being in a common organic solvent to provide a primer coating;
   (ii) coating over the primer coating a second dilute solution of perfluoropolyether monomer having an average of at least about 1.5 ethylenically unsaturated polymerizable sites per molecule and having the formula $$Q(R_f)_k C_a F_{2a} - Z$$

wherein Q comprises a polymerizable group attached to $R_f$ which represents a chain of one or more randomly distributed perfluoroalkylene oxide units selected from the group consisting of $$(C_a F_{2a} O) \text{ and } (CF-CF_2O) \atop CF_3$$

in which a is independently an integer of 1 to 4, k is the number of such repeating units having a value from 1 to 300 such that the segment $R_f$ preferably has a number average molecular weight of about 500 to 10,000, and Z is selected from the group consisting of $-OC_a F_{2a+1}$ and Q;

(iii) drying said coatings; and
   (iv) polymerizing the dried coatings, the thickness of the resulting protective coating not exceeding 200 nm.

13. The method of claim 12 wherein the phosphorylated monomer or oligomer is selected from the group consisting of phosphorylated $\alpha,\beta$-unsaturated carboxylic acid esters of hydroxyalkyl polyhydric phenols; phosphorylated acrylates and methacrylates of glycidyl esters of dicarboxylic acids; and phosphorylated acrylates of hydroxy urethanes.

14. The method of claim 12 which further comprises drying the primer coating of step (i) to remove most of the solvent before step (ii).

15. Method as defined in claim 14 wherein step (iv) comprises exposing the two coatings to ultraviolet radiation.

16. The method of claim 14 wherein the weight ratio of the perfluoropolyether of step (ii) to the phosphorylated monomer or oligomer of step (i) is from about 1/1 to about 5/1.

17. The method of claim 12 wherein the solvent for step (i) is selected from the group consisting of methylethyl ketone, methylisobutylketone, tetrahydrofuran, toluene, benzene, xylene, cyclohexanone, ethanol and mixtures thereof.

* * * * *

UNITED STATES PATENT AND TRADEMARK OFFICE
CERTIFICATE OF CORRECTION

PATENT NO.  : 4,526,833
DATED       : July 2, 1985
INVENTOR(S) : Mario D. Burguette and George D. Foss It is certified that error appears in the above-identified patent and that said Letters Patent is hereby corrected as shown below:

In Column 2, line 33, "ethylene" should be --ethylenic--.

In Column 12, line 2 "$\alpha$, 62-unsaturaged" should be -- $\alpha$, $\beta$-unsaturated--

*Signed and Sealed this*

*Twenty-ninth* Day of *October 1985*

[SEAL]

*Attest:*

DONALD J. QUIGG

*Attesting Officer*

*Commissioner of Patents and Trademarks—Designate*

UNITED STATES PATENT AND TRADEMARK OFFICE
CERTIFICATE OF CORRECTION

PATENT NO.  : 4,526,833

DATED       : July 2, 1985

INVENTOR(S) : Mario D. Burguette and George D. Foss

It is certified that error appears in the above-identified patent and that said Letters Patent is hereby corrected as shown below:

In Column 11, lines 25, 45 and 58, "composition" should be --magnetic recording medium--.

Signed and Sealed this

Thirtieth Day of December, 1986

Attest:

DONALD J. QUIGG

Attesting Officer

Commissioner of Patents and Trademarks